(12) United States Patent
Mizukami (10) Patent No.: US 8,008,819 B2
(45) Date of Patent: Aug. 30, 2011

(54) SPINDLE MOTOR AND STORAGE DISK DRIVE APPARATUS

(75) Inventor: Junya Mizukami, Kyoto (JP)

(73) Assignee: Nidec Corporation, Kyoto (JP)

( * ) Notice: Subject to any disclaimer, the term of this patent is extended or adjusted under 35 U.S.C. 154(b) by 237 days.

(21) Appl. No.: 12/391,392

(22) Filed: Feb. 24, 2009

(65) Prior Publication Data
US 2009/0212648 A1 Aug. 27, 2009

(30) Foreign Application Priority Data

Feb. 25, 2008 (JP) ................................. 2008-042591

(51) Int. Cl.
*H02K 5/16* (2006.01)
(52) U.S. Cl. ........................................................ 310/90
(58) Field of Classification Search .................... 310/90; 384/100, 107
See application file for complete search history.

(56) References Cited

U.S. PATENT DOCUMENTS

| 7,201,516 | B2 * | 4/2007 | Haga ............................. 384/100 |
| 2003/0108257 | A1 | 6/2003 | Gomyo |
| 2005/0183906 | A1 | 8/2005 | Misu et al. |
| 2005/0274018 | A1 * | 12/2005 | Gomyo et al. ............. 29/898.02 |
| 2006/0097592 | A1 * | 5/2006 | Sumi ................................. 310/90 |
| 2006/0207234 | A1 * | 9/2006 | Ward et al. ....................... 55/524 |
| 2007/0217721 | A1 * | 9/2007 | Asada et al. .................. 384/100 |

FOREIGN PATENT DOCUMENTS

| JP | 2005-273908 A | 10/2005 |
| JP | 2006-266367 A | 10/2006 |
| JP | 3984462 B2 | 10/2007 |

* cited by examiner

*Primary Examiner* — Nguyen N Hanh
(74) *Attorney, Agent, or Firm* — Keating & Bennett, LLP (57) ABSTRACT

A spindle motor includes a rotor unit and a stator unit arranged to rotatably support the rotor unit about a central axis through a fluid dynamic pressure generated in a lubricant held within a bearing gap between the rotor unit and the stator unit. The bearing gap has an annular opening coaxial or substantially coaxial with the central axis, the lubricant defining a capillary seal near the opening within the bearing gap. An oil buffer continuously expanding outwards from the opening of the bearing gap is provided between the rotor unit and the stator unit, the oil buffer being used in temporarily storing the lubricant when the lubricant is filled into the bearing gap, and an oleophobic treatment is performed on a surface of the rotor unit and a surface of the stator unit outside the oil buffer.

14 Claims, 11 Drawing Sheets

SPINDLE MOTOR AND STORAGE DISK DRIVE APPARATUS

BACKGROUND OF THE INVENTION

1. Field of the Invention

The present invention relates to an electric spindle motor and a storage disk drive apparatus provided with the same.

2. Description of the Related Art

Conventionally, a storage disk drive apparatus, such as a hard disk drive or the like, includes a spindle motor for rotating a storage disk. In recent years, a fluid dynamic pressure bearing mechanism that makes use of the dynamic pressure of a lubricant held in a bearing gap between a rotor unit and a stator unit is used as a bearing mechanism in the spindle motor.

With the fluid dynamic pressure bearing mechanism, a tapering portion in which the width of the bearing gap increases toward the outside is formed near the opening of the bearing gap bordering the outside. The boundary surface of a lubricant is positioned in the tapering portion. Due to the capillary phenomenon and surface tension, the boundary surface of the lubricant is formed into a meniscus shape, which assists in preventing leakage of the lubricant.

When manufacturing this type of fluid dynamic pressure bearing mechanism, it is necessary to perform a cleaning step in which lubricant droplets adhering to the outer wall surface of the tapering portion are removed with a solvent or the like after the lubricant has been filled. Therefore, a limit has existed in shortening the manufacturing process.

SUMMARY OF THE INVENTION

In order to overcome the problems described above, preferred embodiments of the present invention provide a spindle motor comprising a rotor unit, a stator unit arranged to rotatably support the rotor unit about a central axis through a fluid dynamic pressure generated in a lubricant held within a bearing gap between the rotor unit and the stator unit. The bearing gap has an annular opening substantially coaxial with the central axis. The lubricant is arranged to define a capillary seal near the annular opening within the bearing gap. The oil buffer is provided between the rotor unit and the stator unit. The oil buffer is arranged to continuously expand in an outward direction from the annular opening of the bearing gap and to temporarily store the lubricant when the lubricant is filled into the bearing gap. Also, an oleophobic material is arranged on a surface of the rotor unit and a surface of the stator unit adjacent the oil buffer.

Also, preferred embodiments of the present invention provide a rotor unit, a stator unit arranged to rotatably support the rotor unit about a central axis through a fluid dynamic pressure generated in a lubricant held within a bearing gap between the rotor unit and the stator unit. The bearing gap has an annular opening substantially coaxial with the central axis. The lubricant is arranged to define a capillary seal near the annular opening within the bearing gap. A recess is defined in at least one of the stator unit and the rotor unit, and the recess is arranged outside the bearing gap and so as to continuously expand in an outward direction from the annular opening. Also, an oleophobic material is arranged on a surface of the rotor unit and a surface of the stator unit adjacent the bearing gap and the recess.

With the preferred embodiments of the present invention, it is possible to rapidly fill a lubricant into a bearing mechanism of a motor. It is also possible to restrain a lubricant from adhering to a rotor unit and a stator unit during the course of filling the lubricant.

In the description of the preferred embodiments of the present invention made herein, the terms "upper", "lower", "left" and "right" used in explaining the positional relationship and orientation of individual members are intended to designate the positional relationship and orientation in the drawings and not to designate the positional relationship and orientation when built in an actual device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
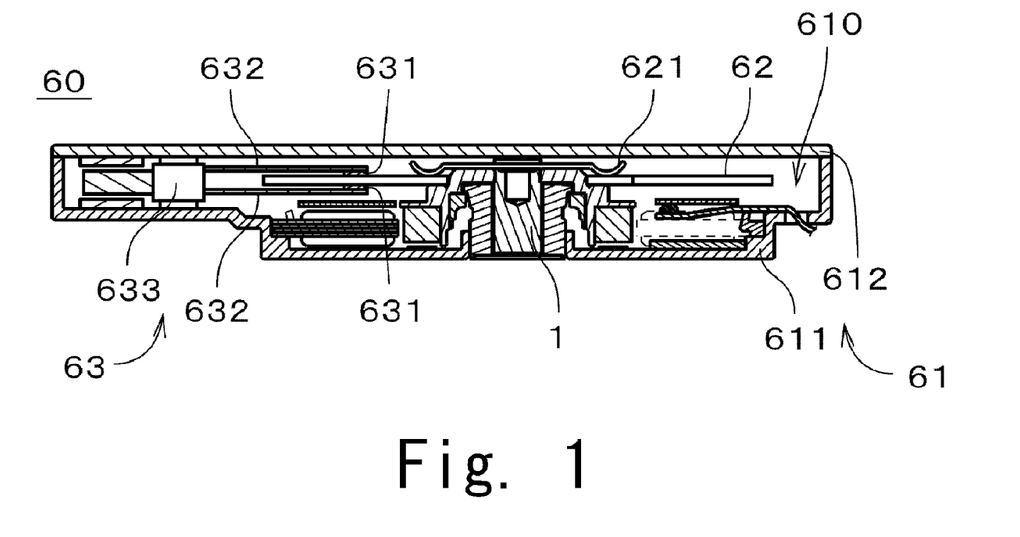
FIG. 1 is a vertical sectional view showing a storage disk drive apparatus in accordance with a first preferred embodiment of the present invention.

FIG. 1 is a vertical sectional view showing the internal construction of a storage disk drive apparatus 60 provided with an electric spindle motor 1 in accordance with a first preferred embodiment of the present invention. The disk drive apparatus 60 is a so-called hard disk drive. The storage disk drive apparatus 60 includes a storage disk 62, an access unit 63 arranged to read and/or write information from and/or on the storage disk 62, an electric spindle motor 1 arranged to hold and rotate the storage disk 62 and a housing 61 arranged to accommodate the storage disk 62, the access unit 63 and the spindle motor 1 within an internal space 610 thereof.

As shown in FIG. 1, the housing 61 preferably includes a first housing member 611 and a second housing member 612. The first housing member 611 is cup-shaped with an open top. The spindle motor 1 and the access unit 63 are attached to the inner bottom portion of the first housing member 611. The second housing member 612 has a flat shape and covers the top opening of the first housing member 611 to define the internal space 610. In the storage disk drive apparatus 60, the housing 61 is defined by bonding the second housing member 612 to the first housing member 611. The internal space 610 of the storage disk drive apparatus 60 is preferably a space in which the presence of dust or dirt is extremely rare.

The storage disk 62 is mounted on the upper side of the spindle motor 1 and fixed in place by a clamp 621. The access unit 63 includes a head 631 arranged to gain access to the storage disk 62 and magnetically reproduce and record information, an arm 632 arranged to support the head 631 and a head moving mechanism 633 arranged to move the arm 632 to thereby displace the head 631 relative to the storage disk 62 and the spindle motor 1. With this arrangement, the head 631 gains access to a desired position on the storage disk 62 and records and reproduces information in a state that the head 631 comes close to the storage disk 62 under rotation, thus performing the tasks of reading and/or writing information.

Figure 2:
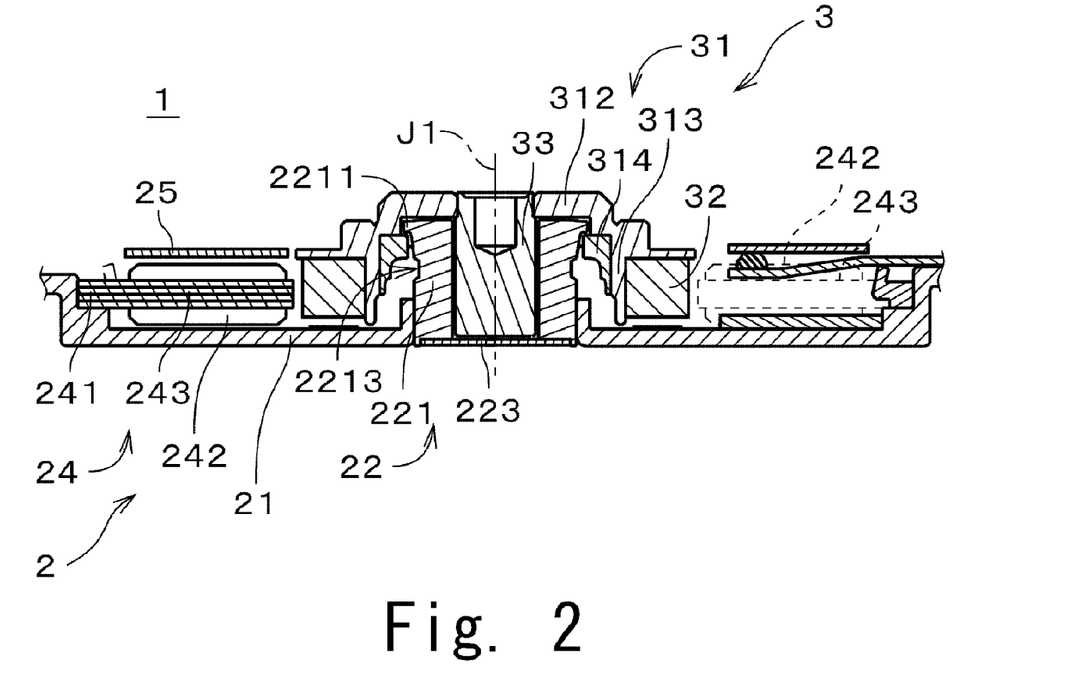
FIG. 2 is a vertical sectional view showing a spindle motor of the storage disk drive apparatus.

FIG. 2 is a vertical sectional view showing the spindle motor 1 used to rotate the storage disk 62 in the storage disk drive apparatus 60. Shown in FIG. 2 is a cross-section taken along a plane containing the central axis J1 of the spindle motor 1. Some constituent portions of the spindle motor 1 lying on the rear side of a cross-sectional plane are depicted by a broken line in FIG. 2.

Referring to FIG. 2, the spindle motor 1 is an inner rotor type spindle motor and includes a stator unit 2 and a rotor unit 3. The rotor unit 3 is rotatably supported on the stator unit 2 about the central axis J1, using the fluid dynamic pressure generated in a lubricant used as a working fluid held in a bearing gap between the stator unit 2 and the rotor unit 3. In the following description, the side on which the rotor unit 3 lies along the central axis J1 will be denoted by the term "upper" and the side on which the stator unit 2 lies along the central axis J1 will be signified by the term "lower". However, it is not necessary for the central axis J1 to coincide with the direction of gravity.

The stator unit 2 preferably includes a base plate 21, a sleeve unit 22, a stator 24 and a magnetic shield plate 25. The base plate 21 defines a portion of the first housing member 611 (see FIG. 1) and holds the respective portions of the stator unit 2 in place. The sleeve unit 22 is coaxial or substantially coaxial with the central axis J1 and has a substantially cylindrical shape with a closed bottom. The sleeve unit 22 defines a portion of the bearing mechanism that rotatably supports the rotor unit 3. The stator 24 is attached to the base plate 21 around the sleeve unit 22. The magnetic shield plate 25 has a thin flat shape and is arranged above the stator 24 to intercept electromagnetic noises emitted by the stator 24.

The sleeve unit 22 includes a sleeve portion 221 and a seal cap 223. The sleeve portion 221 is coaxial or substantially coaxial with the central axis J1 and has a substantially cylindrical shape. The below-mentioned shaft 33 of the rotor unit 3 is inserted into the sleeve portion 221 with the lubricant interposed therebetween. The seal cap 223 has a substantially disk-like shape and closes the lower end opening of the sleeve portion 221. The sleeve unit 22 is fixed to the base plate 21 by press-fitting the lower portion of the sleeve portion 221 into the central aperture of the base plate 21, for example. The sleeve portion 221 is provided at its top end with a flange 2211 projecting radially outwards in a coaxial or substantially coaxial relationship with the central axis J1. In a substantially axial middle region of the outer surface of the sleeve portion 221, an annular groove-like recess 2213 circumferentially extending in a coaxial relationship with the central axis J1 is arranged. The recess 2213 will be referred to as a "sleeve recess 2213" below.

The stator 24 preferably includes a stator core 241, which has a plurality of teeth 243 radially arranged about the central axis J1, and a plurality of coils 242 preferably formed by winding a conductive wire on the teeth 243.

The rotor unit 3 includes a rotor hub 31, a rotor magnet 32 and a shaft 33. The rotor hub 31 holds the respective portions of the rotor unit 3 in place. The storage disk 62 (see FIG. 1) is mounted to the rotor hub 31. The rotor magnet 32 is arranged around the central axis J1 and fixed to the rotor hub 31. The shaft 33 is coaxial or substantially coaxial with the central axis J1 and has a substantially cylindrical shape. The shaft 33 protrudes axially downwards from the rotor hub 31. In the present preferred embodiment, the shaft 33 is inserted into and fixed to the central hole of the rotor hub 31. Alternatively, the shaft 33 and the rotor hub 31 may be seamlessly formed together as a single piece.

The rotor hub 31 includes a disk portion 312 and a cylinder portion 313. The disk portion 312 is coaxial or substantially coaxial with the central axis J1 and has a substantially disk-like shape. The disk portion 312 extends radially outwards from the upper end portion of the shaft 33 in a perpendicular or substantially perpendicular relationship with respect to the central axis J1. The cylinder portion 313 is coaxial or substantially coaxial with the central axis J1 and has a substantially cylindrical shape. The cylinder portion 313 protrudes axially downwards from the outer edge of the disk portion 312. The cylinder portion 313 has an annular removal-preventing member 314 provided on the radial inner side thereof in a coaxial relationship with the central axis J1. The removal-preventing member 314 lies below the flange 2211 of the sleeve portion 221 and partially overlaps with the flange 2211 when seen in a plan view, thereby preventing the rotor hub 31 from being removed from the sleeve unit 22.

Figure 3:
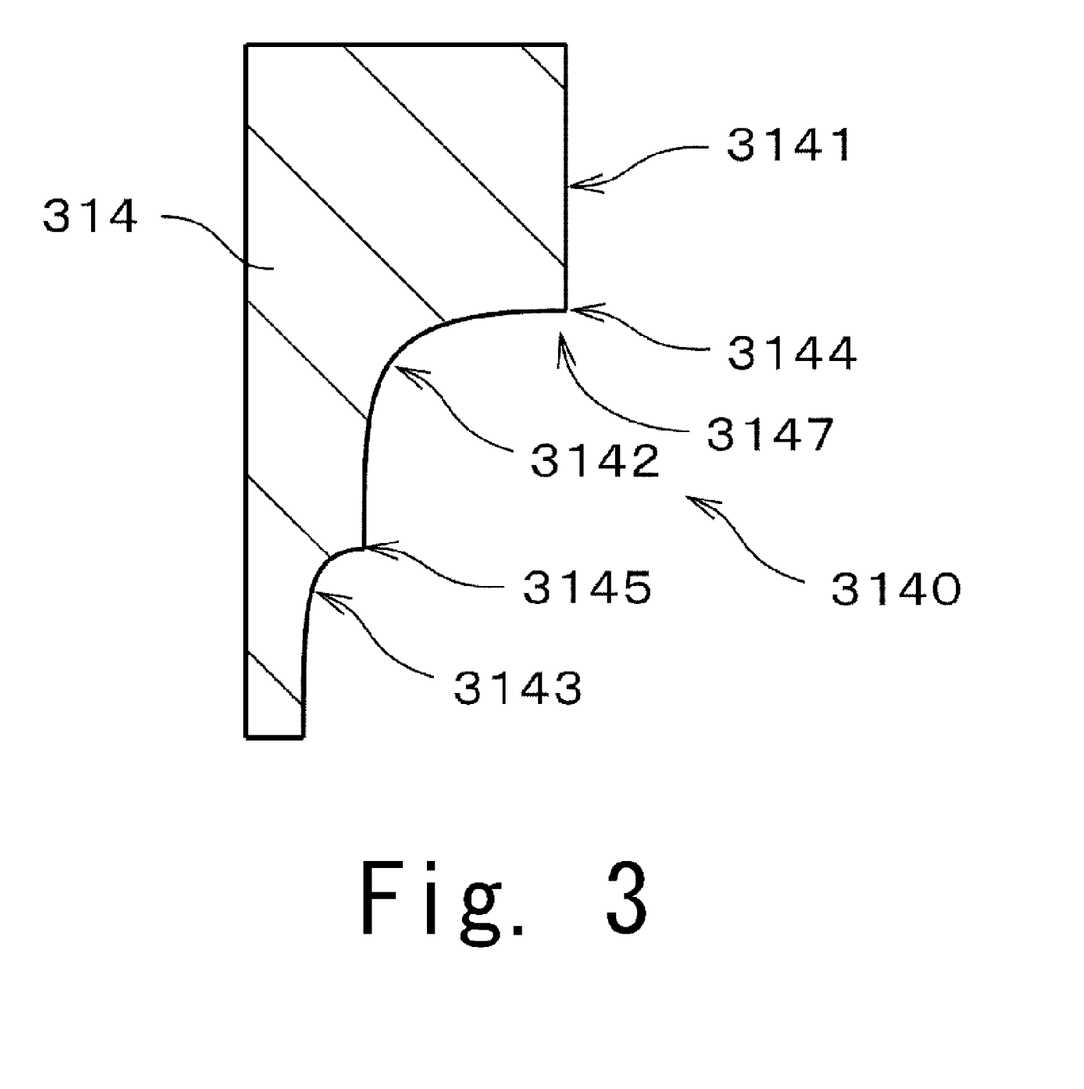
FIG. 3 is a vertical sectional view showing a removal-preventing member in an enlarged scale.

FIG. 3 is a vertical sectional view showing the removal-preventing member 314 in an enlarged scale. As shown in FIG. 3, the removal-preventing member 314 has an inner surface 3140 which are divided into a first inner surface 3141, a second inner surface 3142 and a third inner surface 3143. The first, second and third inner surfaces 3141, 3142 and 3143 are respectively arranged from the axial upper side to the axial lower side in the named sequence. The first inner surface 3141 is a cylindrical surface coaxial with the central axis J1 and uniform in inner diameter. The second inner surface 3142 joins the first inner surface 3141 at a border 3144. The third inner surface 3143 joins the second inner surface 3142 at a border 3145. The second inner surface 3142 has an inner diameter that increases as it moves axially downwards from the border 3144 in the upper region of the second inner surface 3142 but remains constant in the lower region of the second inner surface 3142. Similarly, the third inner surface 3143 has an inner diameter that increases as it moves axially downwards from the border 3145 in the upper region of the third inner surface 3143 but remains constant in the lower region of the third inner surface 3143. In the inner surface 3140 of the removal-preventing member 314 of the cylinder portion 313, the region near the border 3144 defines a step portion 3147 whose inner diameter increases as it moves towards the tip end of the cylinder portion 313.

The rotor magnet 32 shown in FIG. 2 is preferably an annular magnet magnetized with multiple poles. The rotor magnet 32 is fixed to the outer surface of the cylinder portion 313 of the rotor hub 31. The rotor magnet 32 is arranged on the side of the central axis J1 with respect to the stator 24 so that the torque acting about the central axis J1 can be generated between the stator 24 and the rotor magnet 32.

Figure 4:
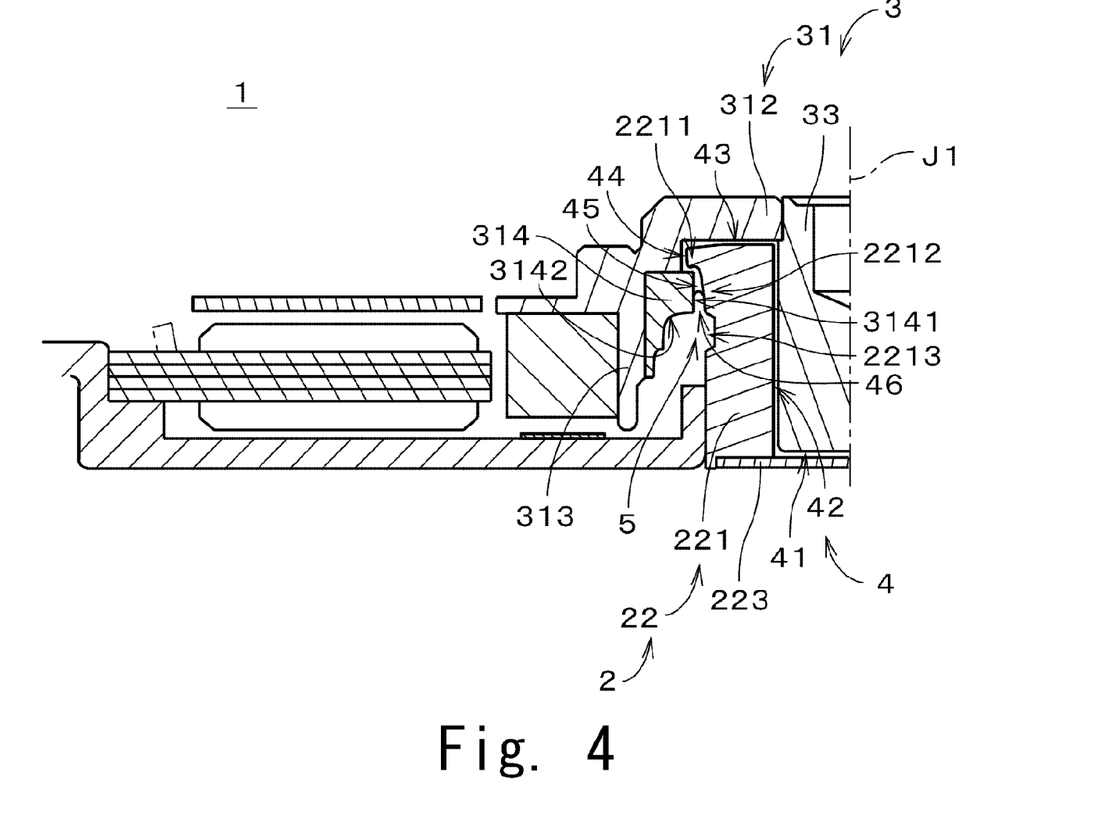
FIG. 4 is a vertical sectional view showing a portion of the spindle motor in an enlarged scale.

Next, description will be made on a bearing mechanism that makes use of the fluid dynamic pressure generated by the lubricant in the spindle motor 1. FIG. 4 is an enlarged vertical section view showing the left half of the spindle motor 1 shown in FIG. 2. As shown in FIG. 4, a small gap 4 arranged to hold a lubricant is defined between the rotor hub 31, the shaft 33 of the rotor unit 3 and the sleeve unit 22 of the stator unit 2 in the spindle motor 1. The gap 4 will be referred to as a "bearing gap 4" below.

The bearing gap 4 includes a small gap 41 defined between the lower surface of the shaft 33 and the upper surface of the seal cap 223, a small gap 42 defined between the inner surface of the sleeve portion 221 and the outer surface of the shaft 33, a small gap 43 defined between the lower surface of the disk portion 312 of the rotor hub 31 and the upper end surface of the sleeve portion 221, a small gap 44 defined between the flange 2211 of the sleeve portion 221 and the inner surface of the cylinder portion 313 of the rotor hub 31, and a small gap 45 defined between the outer surface of a region 2212 between the flange 2211 and the sleeve recess 2213 of the sleeve portion 221 and the first inner surface 3141 of the removal-preventing member 314 of the cylinder portion 313. The region 2212 will be referred to as an "upper sleeve region 2212" below.

The bearing gap 4 opens outwards at the axial lower end of the small gap 45. In the following description, the annular opening 46 of the bearing gap 4 facing toward the outside and circumferentially extending coaxially with the central axis J1 will be referred to as a "bearing opening 46". In the spindle motor 1, the bearing opening 46 is arranged between the inner surface 3140 (see FIG. 3) of the removal-preventing member 314 of the cylinder portion 313 and the outer surface of the sleeve portion 221. The border between the upper sleeve region 2212 and the sleeve recess 2213 of the sleeve portion 221 becomes an inner circumferential edge of the bearing opening 46. The border 3144 (see FIG. 3) between the first inner surface 3141 and the second inner surface 3142 of the removal-preventing member 314 of the rotor hub 31 becomes an outer circumferential edge of the bearing opening 46. In other words, the step portion 3147 (see FIG. 3) provided in the inner surface 3140 of the removal-preventing member 314 defines a portion of the edges of the bearing opening 46.

In the spindle motor 1, a bearing mechanism arranged to support the rotor unit 3 to rotate about the central axis J1 with respect to the stator unit 2 is constructed by filling a lubricant into the small gaps 41 to 45. For the purpose of clear illustration, the size of the small gaps 41 to 45 depicted in FIG. 4 is exaggerated. These small gaps 41 to 45 are actually much smaller than they are depicted as being in FIG. 4.

In the bearing mechanism, the outer surface of the upper sleeve region 2212 is defined by a slanting surface whose outer diameter gradually decreases axially downwards. As mentioned above, the inner diameter of the first inner surface 3141 of the removal-preventing member 314 opposed to the outer surface of the upper sleeve region 2212 remains constant. Thus, the width of the small gap 45 (namely, the radial distance about the central axis J1) between the upper sleeve region 2212 and the first inner surface 3141 of the removal-preventing member 314 gradually decreases as it moves axially upwards from the bearing opening 46. In other words, the radial distance between the stator unit 2 and the rotor unit 3 in the vicinity of the bearing opening 46 of the bearing gap 4 gradually decreases from the bearing opening 46 toward the inside of the bearing gap 4. In the spindle motor 1, the boundary surface of the lubricant held within the bearing gap 4 is positioned in the small gap 45. The boundary surface of the lubricant has a meniscus shape due to the capillary phenomenon and surface tension, thus providing a tapering seal. The tapering seal serves as a capillary seal, whereby the lubricant is prevented from leaking out of the bearing gap 4.

On the upper end surface of the sleeve portion 221, grooves by which a pressure acting toward the central axis J1 is generated in the lubricant during rotation of the rotor unit 3 are defined. The grooves defined on the upper end surface of the sleeve portion 221 may be, e.g., spiral grooves. The upper end surface of the sleeve portion 221 and the lower surface of the disk portion 312 of the rotor hub 31 opposing the upper end surface define a thrust dynamic pressure bearing unit. On the surface of the sleeve portion 221 opposing the shaft 33, there grooves by which a fluid dynamic pressure is generated in the lubricant are defined. The grooves defined on the surface of the sleeve portion 221 may be, e.g., herringbone grooves defined in the upper and lower regions of the inner surface of the sleeve portion 221. The surface of the sleeve portion 221 opposing the shaft 33 and the outer circumferential surface of the shaft 33 constitute a radial dynamic pressure bearing unit.

In the spindle motor 1, the bearing mechanism making use of a fluid dynamic pressure supports the rotor unit 3 through the lubricant in a non-contacting manner. Accordingly, this makes it possible to rotate the rotor unit 3 and the storage disk 62 (see FIG. 1) mounted to the rotor unit 3 with increased accuracy and reduced noises.

An oil buffer 5 is provided in the spindle motor 1. The oil buffer 5 preferably includes an annular space coaxial or substantially coaxial with the central axis J1. The width of the oil buffer 5 is continuously broadened as it moves outwards from the bearing opening 46 of the bearing gap 4 and is used to temporarily store (or accommodate) the lubricant when the lubricant is filled into the bearing gap 4 during the manufacture of the spindle motor 1. The oil buffer 5 is provided between the second inner surface 3142 of the removal-preventing member 314 of the rotor unit 3 and the outer surface of the sleeve recess 2213 of the sleeve portion 221 of the stator unit 2.

In the spindle motor 1, the radial distance of the oil buffer 5 between the stator unit 2 and the rotor unit 3 (i.e., the width of the oil buffer 5) gradually increases as it moves axially downwards from the bearing opening 46. As mentioned above, the radial distance of the small gap 45 between the stator unit 2 and the rotor unit 3 (i.e., the width of the small gap 45) also gradually increases as it moves axially downwards. In the vicinity of the bearing opening 46, the increasing rate of the width of the oil buffer 5 is greater than that of the width of the small gap 45.

Figure 5:
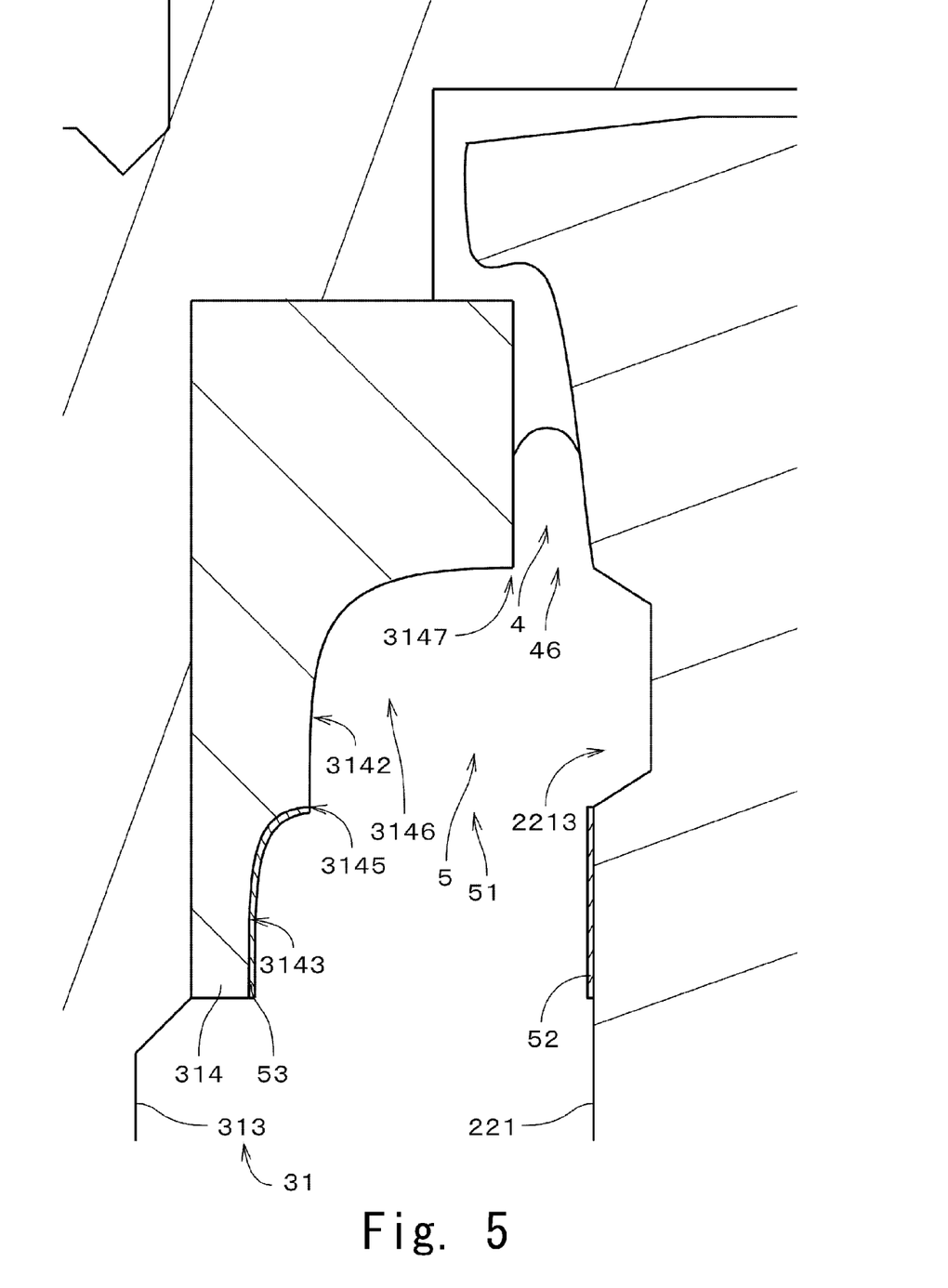
FIG. 5 is a vertical sectional view showing an oil buffer and its vicinity in an enlarged scale.

FIG. 5 is an enlarged vertical section view showing the oil buffer 5 joining to the bearing gap 4 and its vicinity. As shown in FIG. 5, the oil buffer 5 includes a rotor hub recess 3146 and the sleeve recess 2213 opposing the rotor hub recess 3146. The rotor hub recess 3146 is an annular recess whose outer side is surrounded by the second inner surface 3142 of the removal-preventing member 314. In other words, the rotor hub recess 3146 is arranged in the cylinder portion 313 of the rotor hub 31 and defined by the step portion 3147 of the inner surface 3140 of the removal-preventing member 314. More specifically, the rotor hub recess 3146 includes a portion of the step portion 3147 and lies axially below the step portion 3147.

In the oil buffer 5, the lower edge of the sleeve recess 2213 serves as the inner edge of an outwardly-facing annular opening 51 of the oil buffer 5. The opening 51 will be referred to as a "buffer opening 51" below. The border 3145 between the second inner surface 3142 and the third inner surface 3143 of the removal-preventing member 314 serves as the outer edge of the buffer opening 51. The volume of the oil buffer 5 (i.e., the volume of an annular space defined between the bearing opening 46 and the buffer opening 51) is set equal to or greater than about 105% of the volume of the bearing gap 4.

In the spindle motor 1, oleophobic layers 52 and 53 are preferably arranged outside the oil buffer 5 by applying an oleophobic agent on the outer surface of the sleeve portion 221 and on the third inner surface 3143 of the removal-preventing member 314 of the rotor unit 3. Alternatively, instead of applying the oleophobic agent, other oleophobic treatments may be performed on the outer surface of the stator unit 2 and on the third inner surface 3143 of the removal-preventing member 314.

Figure 6:
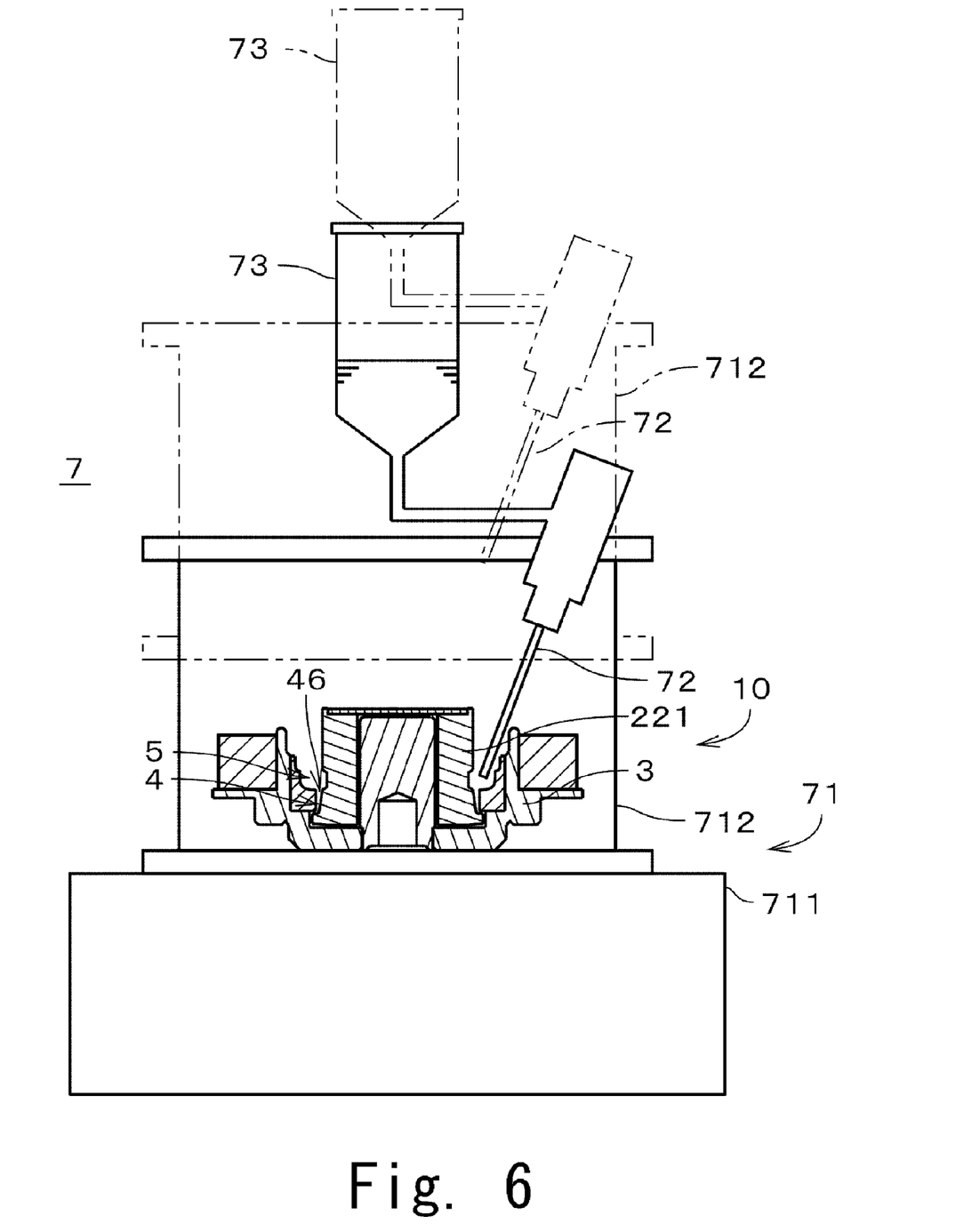
FIG. 6 is a view illustrating a filling device.

Next, description will be made on how to fill the lubricant into the bearing gap 4 of the spindle motor 1. FIG. 6 is a view showing a filling device 7 for use in filling the lubricant. As shown in FIG. 6, the filling device 7 includes a vacuum vessel 71 arranged to accommodate the spindle motor 1 undergoing a manufacturing process, a nozzle 72 arranged to eject the lubricant and a lubricant reservoir 73 arranged to store (or contain) the lubricant. The vacuum vessel 71 and the lubricant reservoir 73 of the filling device 7 are connected to a vacuum pump and a gas supply mechanism (not shown). A space exists above the lubricant stored (or contained) in the lubricant reservoir 73. The space is depressurized to reduce the concentration of the gas dissolved in the lubricant. In the filling device 7, the concentration of the gas dissolved in the lubricant may be further reduced by stirring the lubricant stored within the lubricant reservoir 73.

Figure 7:
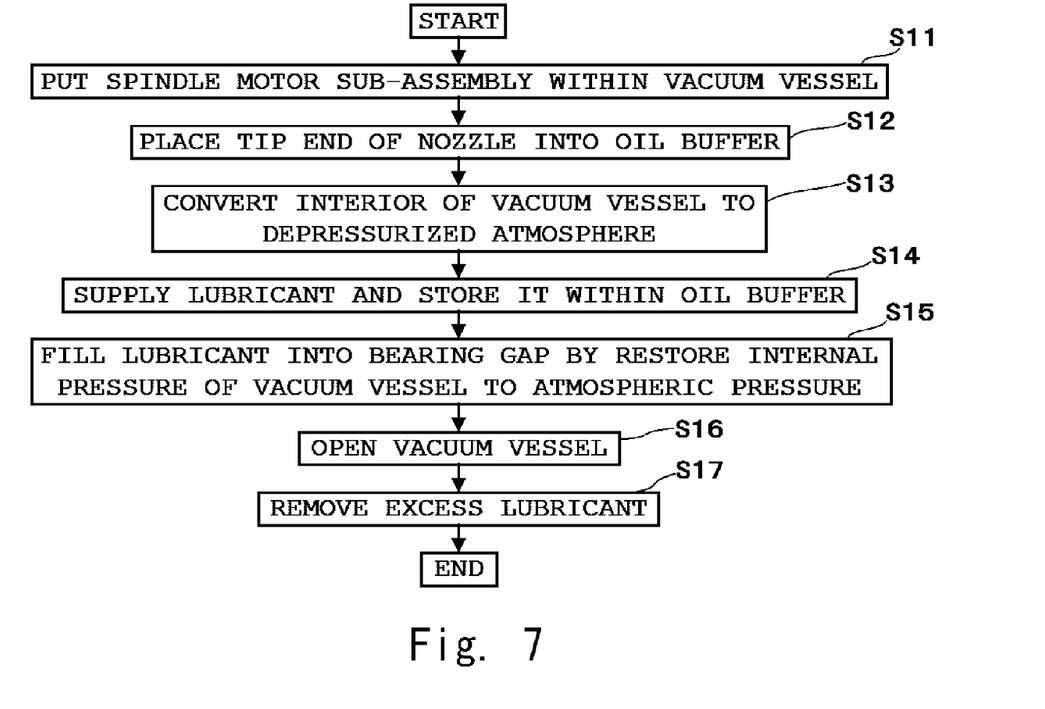
FIG. 7 is a flowchart illustrating the flow of steps for filling a lubricant.

FIG. 7 is a flowchart illustrating the process flow through which the lubricant is filled by the filling device 7. Prepared first is a spindle motor sub-assembly 10, i.e., the spindle motor 1 undergoing a manufacturing process. The spindle motor sub-assembly 10 includes the sleeve portion 221 and the rotor unit 3, both of which are not fixed to the base plate 21 (see FIG. 2) as yet.

As shown in FIG. 6, the spindle motor sub-assembly 10 is placed on the table 711 of the vacuum vessel 71 of the filling device 7 in an overturned state. In other words, the spindle motor sub-assembly 10 is placed on a table 711 in a state that the oil buffer 5 lies above the bearing opening 46. A case 712 opened at its lower side is moved down from the position indicated by a double-dotted chain line in FIG. 6 and is attached to the table 711. Thus the spindle motor sub-assembly 10 is accommodated within the vacuum vessel 71 (step S11). In the filling device 7, the nozzle 72 and the lubricant reservoir 73 are also moved down together with the case 712 of the vacuum vessel 71. The tip end of the nozzle 72 is positioned within the oil buffer 5 of the spindle motor sub-assembly 10 (step S12).

Subsequently, the interior of the vacuum vessel 71 is evacuated into a vacuum atmosphere. As a result, the interior of the bearing gap 4 of the spindle motor sub-assembly 10 is also converted to a vacuum atmosphere (step S13). A gas, e.g., an air, is then fed into the lubricant reservoir 73. Consequently, the lubricant in which the concentration of the dissolved gas has been reduced in advance is supplied from the lubricant reservoir 73 to the oil buffer 5 of the spindle motor sub-assembly 10 through the nozzle 72 and is stored (or accommodated) within the oil buffer 5 (step S14). The quantity of the lubricant supplied to the oil buffer 5 at this time is equal to the quantity of the lubricant to be held within the bearing gap 4 of the spindle motor 1. The lubricant supplied to the oil buffer 5 is partly moved into the bearing gap 4 through the bearing opening 46. In the spindle motor sub-assembly 10, the bearing opening 46 is entirely covered with the lubricant staying within the oil buffer 5.

Once the lubricant has been supplied to the oil buffer 5, an air is admitted into the vacuum vessel 71 to restore the internal pressure of the vacuum vessel 71 to the atmospheric pressure. Thus the pressure developed outside the bearing gap 4 becomes greater than the internal pressure of the bearing gap 4. As a consequence, the lubricant stored in the oil buffer 5 is filled into the bearing gap 4 through the bearing opening 46 (step S15).

After the lubricant has been filled into the bearing gap 4, the case 712 of the vacuum vessel 71 is moved upwards together with the nozzle 72 and the lubricant reservoir 73, thereby opening the vacuum vessel 71 (step S16). Then the outer surface of the sleeve recess 2213 shown in FIG. 5, the second inner surface 3142 of the removal-preventing member 314 and the oleophobic layers 52 and 53 are wiped by, e.g., a worker to remove the excess lubricant adhering thereto (step S17). In the filling device 7 shown in FIG. 6, a plurality of the spindle motor sub-assemblies 10 may be accommodated within the vacuum vessel 71 at the same time, and the lubricant may be simultaneously applied to the plurality of the spindle motor sub-assemblies 10 with a plurality of the nozzles 72 in the spindle motor sub-assemblies 10.

As described above, the spindle motor 1 is provided with the oil buffer 5 continuously and greatly expanding from the bearing opening 46 of the bearing gap 4 toward the outside. In the process of filling the lubricant into the bearing gap 4, the lubricant is temporarily stored (or accommodated) within the oil buffer 5. Consequently, as compared to a case in which the lubricant would be directly supplied to and filled into the bearing gap, an increased quantity of lubricant can be filled into the spindle motor sub-assembly 10 by supplying the lubricant only once. This makes it possible to easily and rapidly fill the lubricant into the bearing mechanism of the spindle motor 1.

In particular, since the volume of the oil buffer 5 is set greater than the volume of the bearing gap 4, the full quantity of lubricant to be held within the bearing gap 4 can be filled into the spindle motor sub-assembly 10 by supplying it only once. Preferably, the volume of the oil buffer 5 is set equal to or greater than about 105% of the volume of the bearing gap 4. As a result, it becomes possible to more easily and rapidly fill the lubricant into the bearing mechanism of the spindle motor 1.

In the spindle motor 1, the bearing gap 4 includes the small gap 42 defined between the outer surface of the shaft 33 and the inner surface of the sleeve portion 221, the small gap 43 positioned radially outwards of the small gap 42 and defined between the lower surface of the disk portion 312 of the rotor hub 31 and the upper end surface of the sleeve portion 221, and the small gap 44 arranged radially outwards of the small gap 43 and defined between the inner surface of the cylinder portion 313 of the rotor hub 31 and the outer surface of the sleeve portion 221, and the small gap 45 arranged radially outwards of the small gap 43 and defined between the inner surface of the sleeve portion 314 and the outer surface of the sleeve portion 221. The oil buffer 5 is provided below the small gap 45. Therefore, as compared to a case that the oil buffer 5 would be provided above or below the small gap 42 or 43, it is possible to reduce the thickness of the spindle motor 1 while allowing the oil buffer 5 to have a large enough volume.

The oil buffer 5 is preferably a structure that includes the annular rotor hub recess 3146 defined by the step portion 3147 of the inner surface 3140 of the removal-preventing member 314 of the cylinder portion 313. This makes it possible to provide the oil buffer 5 with ease while allowing the oil buffer 5 to have a great enough volume. Since the oil buffer 5 has a structure that includes the sleeve recess 2213 arranged on the outer surface of the sleeve portion 221 in an opposing relationship with the rotor hub recess 3146, it is possible to provide the oil buffer 5 with ease while allowing the oil buffer 5 to have a great enough volume.

In the spindle motor 1, the oleophobic layers 52 and 53 are respectively arranged on the outer surface of the sleeve portion 221 and on the third inner surface 3143 of the removal-preventing member 314 of the rotor unit 3 outside the oil buffer 5. This restrains the lubricant from adhering to the portions outside the oil buffer 5. Furthermore, lubricant adhering to the portions outside the oil buffer 5 is easily removed when the lubricant adhering to the portions outside the bearing gap 4 is wiped away after the lubricant filling operation.

As described above, the oil buffer 5 includes the rotor hub recess 3146 defined by the step portion 3147 of the inner surface 3140 of the removal-preventing member 314. This makes it possible to increase the size of the buffer opening 51. As a result, it becomes easy to remove the lubricant adhering to the inside of the oil buffer 5. In the spindle motor 1, oleophobic layers may be arranged on the outer surface of the sleeve recess 2213 and on the second inner surface 3142 of the removal-preventing member 314 inside the oil buffer 5. This makes it easier to remove the lubricant adhering to the inside of the oil buffer 5.

In the manufacture of some conventional motors, a lubricant is filled into a bearing gap by dipping a bearing sleeve into the lubricant. Thus, the lubricant adheres to the entire surface of the bearing sleeve, eventually increasing the area from which the lubricant needs to be wiped away in the cleaning process performed after the lubricant filling operation. This makes it difficult to shorten the amount time required in the cleaning process. In the manufacture of other conventional motors, a lubricant is directly filled into a bearing gap through a narrow tapering portion. However, the quantity of the lubricant that can be held by the tapering portion is smaller than the quantity of the lubricant to be held in the bearing gap of a finished motor. This makes it necessary to perform the lubricant filling operation several times, which increases the amount of time required in fully filling the lubricant.

As described above, it is easy in the spindle motor 1 to remove the lubricant adhering to the portions outside the bearing gap 4. Accordingly, the structure of the spindle motor 1 set forth above is particularly suitable for use in a spindle motor employed as a drive power source of the storage disk drive apparatus 60 in which the internal space 610 of the housing 61 needs to be kept very clean.

Figure 8:
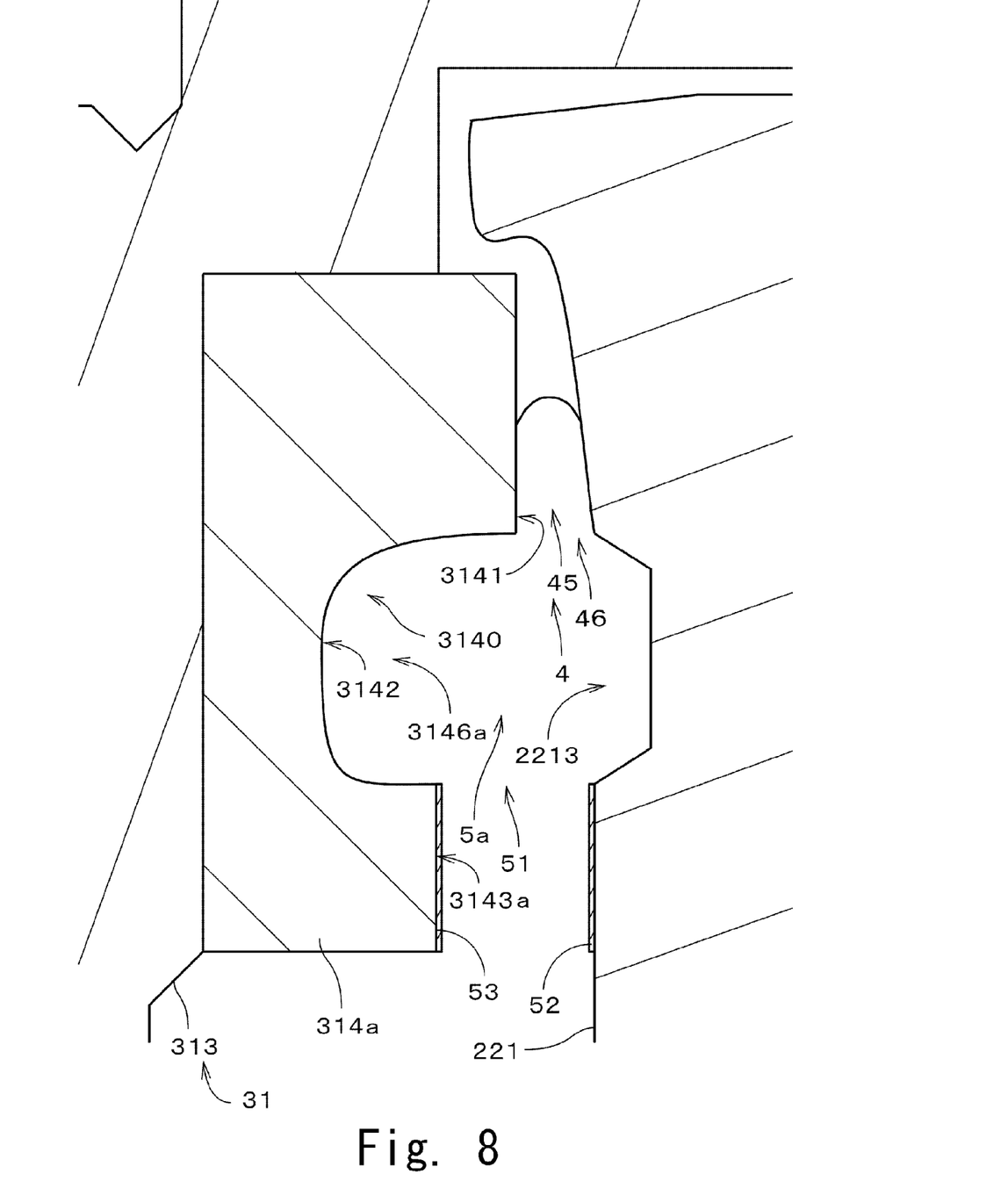
FIG. 8 is a vertical sectional view showing a modified example of the oil buffer and its vicinity in an enlarged scale.

Next, description will be made on a spindle motor in accordance with a modified example of the first preferred embodiment. FIG. 8 is an enlarged vertical section view showing an oil buffer 5a of the modified example and its vicinity. In the spindle motor of the modified example shown in FIG. 8, a removal-preventing member 314a differing in shape from the removal-preventing member 314 shown in FIG. 5 is provided in the cylinder portion 313 of the rotor hub 31. An oil buffer 5a differing in shape from the oil buffer 5 shown in FIG. 5 is also provided. Other structures are the same as the structures of the spindle motor 1 shown in FIGS. 1 to 5. Therefore, the equivalent portions will be designated by like reference numerals in the following description. The process flow of filling the lubricant into the bearing gap 4 of the spindle motor in accordance with the modified example is the same as that of the first preferred embodiment and, therefore, will be omitted from description.

As shown in FIG. 8, the removal-preventing member 314a has an annular groove-like rotor hub recess 3146a circumferentially extending in a coaxial relationship with the central axis J1. The rotor hub recess 3146a is arranged below the first inner surface 3141 that defines the small gap 45 of the bearing gap 4. The oil buffer 5a includes the rotor hub recess 3146a and the sleeve recess 2213 defined on the outer surface of the sleeve portion 221 in a radially opposing relationship with the rotor hub recess 3146a.

In the spindle motor of the modified example, the oil buffer 5a continuously grows wider as it moves toward the outside from the bearing opening 46 of the bearing gap 4 as in the first preferred embodiment. The lubricant is temporarily stored (or accommodated) in the oil buffer 5a when it is filled into the bearing gap 4. This makes it possible to easily and rapidly fill the lubricant into the bearing mechanism of the spindle motor. In the spindle motor, the volume of the oil buffer 5a is set to be greater than the volume of the bearing gap 4. Preferably, the volume of the oil buffer 5a is equal to or greater than about 105% of the volume of the bearing gap 4. As a result, the lubricant to be held in the bearing gap 4 can be fully stored (or accommodated) in the oil buffer 5a by supplying the lubricant only once. This makes it possible to more easily and rapidly fill the lubricant into the bearing mechanism of the spindle motor.

In the spindle motor of the modified example, the oil buffer 5a has a structure including the annular rotor hub recess 3146a defined in the removal-preventing member 314a of the rotor unit 3 (see FIG. 4). This makes it possible to provide the oil buffer 5a with ease while allowing the oil buffer 5a to have a large enough volume. In addition, the oil buffer 5a has a structure including the sleeve recess 2213 defined in the sleeve portion 221 of the stator unit 2 (see FIG. 4). This makes it possible to provide the oil buffer 5a with greater ease while allowing the oil buffer 5a to have a large enough volume.

In the spindle motor, the oleophobic layers 52 and 53 are arranged on the outer surface of the sleeve portion 221 and on a third inner surface 3143a of the removal-preventing member 314a of the rotor unit 3 outside the oil buffer 5a. This restrains the lubricant from adhering to the portions outside the oil buffer 5a. Furthermore, the lubricant adhering to the portions outside the oil buffer 5a is easily removed when the lubricant adhering to the portions outside the bearing gap 4 is wiped away after the lubricant filling operation.

In the oil buffer 5a, the buffer opening 51 has an increased size. This increased size makes it easy to remove the lubricant adhering to the inside of the oil buffer 5a. In the spindle motor of the modified preferred embodiment, oleophobic layers may be arranged on the outer surface of the sleeve recess 2213 and on the second inner surface 3142, i.e., the inner surface of the rotor hub recess 3146a, inside the oil buffer 5a. This makes it easier to remove the lubricant adhering to the inside of the oil buffer 5a.

Figure 9:
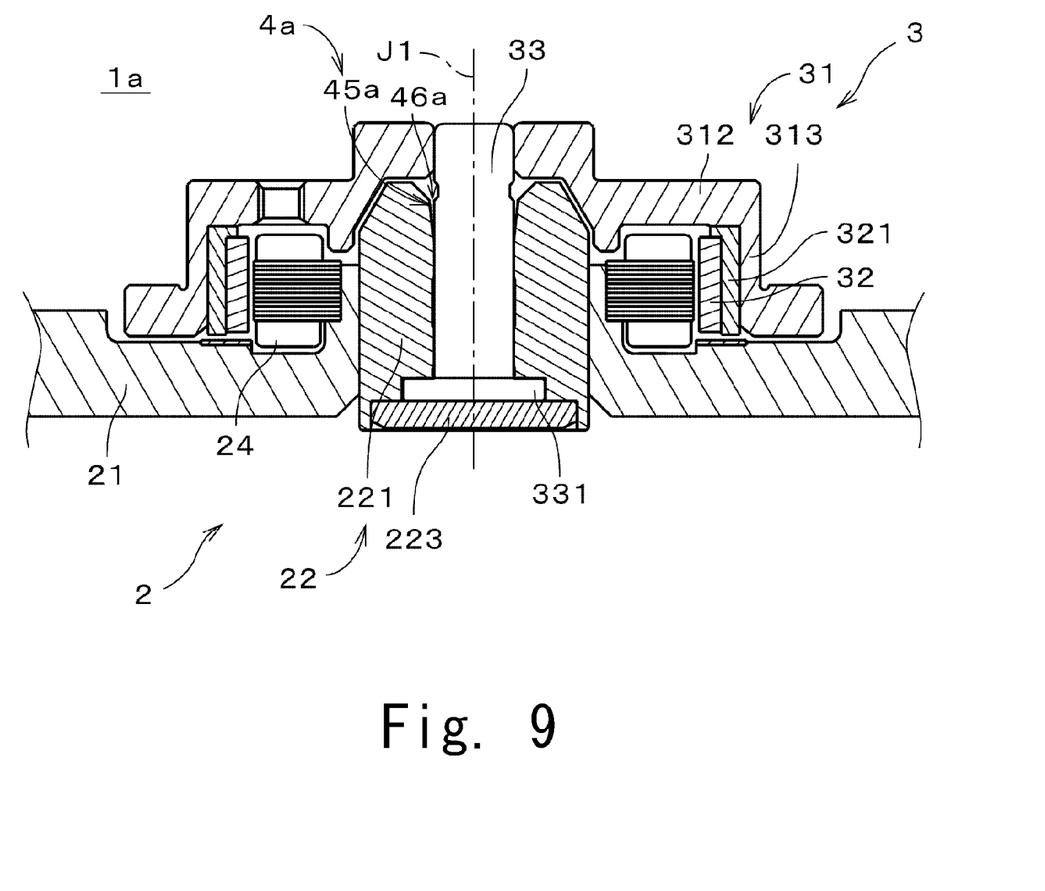
FIG. 9 is a vertical sectional view showing a spindle motor in accordance with a second preferred embodiment of the present invention.

Next, description will be made on a spindle motor in accordance with a second preferred embodiment of the present invention. FIG. 9 is a vertical section view showing a spindle motor 1a of the second preferred embodiment. As can be seen in FIG. 9, the spindle motor 1a is an outer rotor type spindle motor. The spindle motor 1a includes a stator unit 2 and a rotor unit 3. The rotor unit 3 is supported on the stator unit 2 so that it can rotate about the central axis J1 with respect to the stator unit 2 using the fluid dynamic pressure generated in the lubricant as a working fluid held in the bearing gap between the stator unit 2 and the rotor unit 3.

The stator unit 2 preferably includes a base plate 21, a sleeve unit 22 and a stator 24. The base plate 21 is configured to support the respective portions of the stator unit 2. The sleeve unit 22 has a substantially cylindrical shape with a closed bottom and is coaxial or substantially coaxial with the central axis J1 and defining a portion of the bearing mechanism. The stator 24 is attached to the base plate 21 around the sleeve unit 22.

The sleeve unit 22 includes a sleeve portion 221 and a seal cap 223. The sleeve portion 221 has a substantially cylindrical shape coaxial or substantially coaxial with the central axis J1. The below-mentioned shaft 33 of the rotor unit 3 is inserted into the sleeve portion 221 with the lubricant interposed therebetween. The seal cap 223 has a substantially disk-like shape and serves to close the lower end opening of the sleeve portion 221.

The rotor unit 3 includes a rotor hub 31, a rotor magnet 32 and a shaft 33. The rotor hub 31 holds the respective portions of the rotor unit 3. A storage disk is preferably mounted to the rotor hub 31. The rotor magnet 32 is attached to the rotor hub 31 through an annular yoke 321 and is arranged around the central axis J1. The rotor magnet 32 is preferably an annular magnet magnetized with multiple poles. Rotational force (torque) acting about the central axis J1 is generated between the stator 24 and the rotor magnet 32. The shaft 33 has a substantially cylindrical columnar shape coaxial or substantially coaxial with the central axis J1 and protrudes axially downwards from the rotor hub 31. The shaft 33 is provided at its lower end with a substantially disk-like thrust plate 331.

In the spindle motor 1a, a small bearing gap 4a arranged to hold a lubricant in place is provided between the rotor hub 31 and the shaft 33 of the rotor unit 3 and the sleeve unit 22 of the stator unit 2. A lubricant is filled into the bearing gap 4a. In other words, the lubricant exists in the bearing gap 4a. This provides a bearing mechanism capable of supporting the rotor unit 3 so that the rotor unit 3 can rotate about the central axis J1 relative to the stator unit 2. The bearing gap 4a includes a small gap defined between the lower surface of the thrust plate 331 and the upper surface of the seal cap 223, a small gap defined between the outer and upper surfaces of the thrust plate 331 and the sleeve portion 221, and a small gap defined between the outer surface of the shaft 33 and the inner surface of the sleeve portion 221. The bearing gap 4a is provided at its axial upper end with a bearing opening 46.

Figure 10:
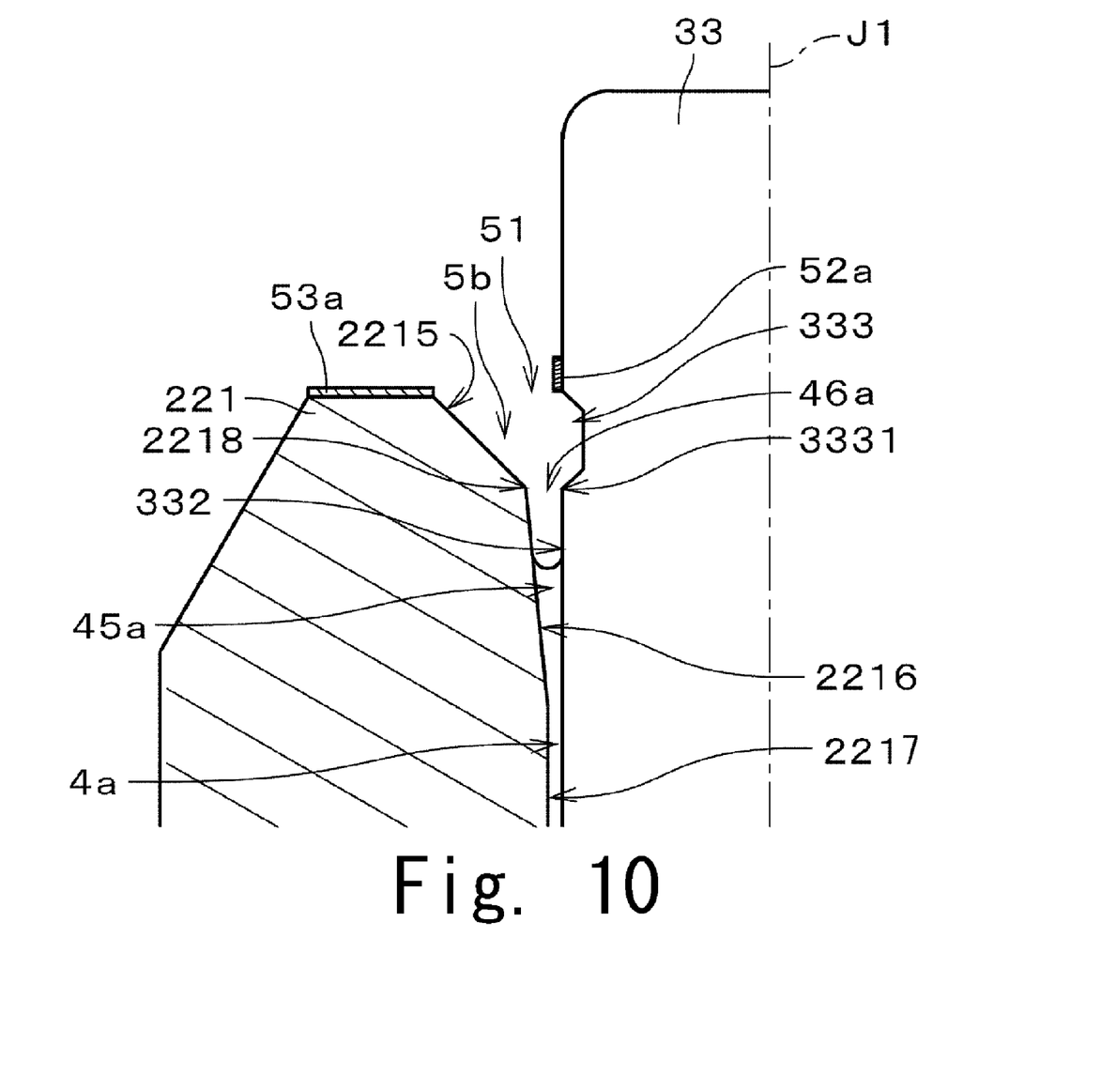
FIG. 10 is an enlarged view illustrating a bearing opening of the second preferred embodiment and its vicinity.

FIG. 10 is an enlarged view showing the bearing opening 46a and its vicinity. In FIG. 10, the rotor hub 31 is omitted from illustration. Referring to FIG. 10, the inner surface of the sleeve portion 221 includes a first slanting surface 2215, a second slanting surface 2216 and a cylindrical surface 2217. The first slanting surface 2215 has an annular shape, the inner diameter of which gradually decreases axially as it moves downwards from the upper end surface of the sleeve portion 221. The second slanting surface 2216 has an annular shape and joins to the lower end of the first slanting surface 2215. The inner diameter of the second slanting surface 2216 gradually decreases axially downwards. The cylindrical surface 2217 joins to the lower end of the second slanting surface 2216 and has a constant inner diameter. As can be seen in FIG. 10, the inclination angle of the first slanting surface 2215 with respect to the central axis J1 is greater than the inclination angle of the second slanting surface 2216 relative to the central axis J1. This is based on the assumption that the cylindrical surface 2217 extending parallel or substantially parallel to the central axis J1 has an inclination angle of about 0 degrees.

On the outer surface 332 of the shaft 33 an annular groove-like recess 333 extending circumferentially in a coaxial or substantially coaxial relationship with the central axis J1 is defined. The recess 333 will be referred to as a "shaft recess 333" below. The shaft recess 333 is radially opposed to the first slanting surface 2215 of the sleeve portion 221. In the spindle motor 1a, the annular space 5b around the central axis J1 between the shaft recess 333 and the first slanting surface 2215 of the sleeve portion 221 serves as an oil buffer 5b arranged to temporarily store (or accommodate) a lubricant when the lubricant is filled into the bearing gap 4a during the course of manufacturing the spindle motor 1a. The border 2218 between the first slanting surface 2215 and the second slanting surface 2216 of the sleeve portion 221 becomes the outer circumferential edge of the bearing opening 46. The lower edge of the 3331 of the shaft recess 333 becomes the inner circumferential edge of the bearing opening 46.

In the bearing gap 4a, the outer surface 332 of the shaft 33 has a constant diameter in the region below the shaft recess 333. Thus, the width of the small gap 45a (i.e., the radial distance about the central axis J1) between the second slanting surface 2216 of the sleeve portion 221 and the outer surface 332 of the shaft 33 gradually decreases as it moves axially downwards from the bearing opening 46. In other words, the radial distance between the stator unit 2 and the rotor unit 3 (see FIG. 9) in the bearing gap 4a near the bearing opening 46 gradually decreases from the bearing opening 46 toward the inside of the bearing gap 4a. In the spindle motor 1a, the boundary surface of the lubricant held within the bearing gap 4a is positioned in the small gap 45a. Due to the capillary phenomenon and surface tension, the boundary surface of the lubricant has a meniscus shape, thus providing a tapering seal. The tapering seal serves as a capillary seal, whereby the lubricant is prevented from being leaked out of the bearing gap 4a.

The process flow of filling the lubricant into the bearing gap 4a of the spindle motor 1a differs from the process flow of the first preferred embodiment in that the spindle motor sub-assembly to be accommodated within the vacuum vessel 71 of the filling device 7 shown in FIG. 6 is defined by only the sleeve unit 22 and the shaft 33 excluding the base plate 21 and the rotor hub 31. Another difference resides in that the spindle motor sub-assembly is placed on the table 711 of the vacuum vessel 71 without having to turn the same over. In other respects, the process flow of this modified preferred embodiment remains the same as that of the first preferred embodiment and therefore will be omitted from description.

In the spindle motor 1a of second preferred embodiment, the oil buffer 5b continuously and greatly expanding outwards from the bearing opening 46a of the bearing gap 4a is provided between the shaft recess 333 of the shaft 33 of the rotor unit 3 and the first slanting surface 2215 of the sleeve portion 221 of the stator unit 2. As in the first preferred embodiment, this makes it possible to easily and rapidly fill the lubricant into the bearing mechanism of the spindle motor 1a. In addition, the volume of the oil buffer 5b is set to be larger than the volume of the bearing gap 4a. Preferably, the volume of the oil buffer 5b is equal to or greater than about 105% of the volume of the bearing gap 4a. As a result, the lubricant to be held in the bearing gap 4a can be fully stored (or accommodated) in the oil buffer 5b by supplying the lubricant only once. This makes it possible to more easily and rapidly fill the lubricant into the bearing mechanism of the spindle motor 1a.

In the spindle motor 1a, the oil buffer 5b has a structure including the annular shaft recess 333 defined in the shaft 33. This makes it possible to form the oil buffer 5b with ease while allowing the oil buffer 5b to have a great enough volume.

As shown in FIG. 10, the spindle motor 1a includes oleophobic layers 52a and 53a defined on the outer surface 332 of the shaft 33 and on the upper end surface of the sleeve portion 221 outside the oil buffer 5b. This restrains the lubricant from adhering to the portions outside the oil buffer 5b. Furthermore, the lubricant adhering to the portions outside the oil buffer 5b is easily removed when the lubricant adhering to the portions outside the bearing gap 4a is wiped away after the lubricant filling operation.

In the oil buffer 5b, the buffer opening 51 has an increased size. This makes it easy to remove the lubricant adhering to the inside of the oil buffer 5b. In the spindle motor 1a, oleophobic layers may be arranged on the outer surface of the shaft recess 333 and on the first slanting surface 2215 of the sleeve portion 221 inside the oil buffer 5b. This makes it easier to remove the lubricant adhering to the inside of the oil buffer 5b.

While certain preferred embodiments of the present invention have been described hereinabove, the present invention is not limited thereto but may be modified or changed in many different forms.

It is not always necessary that the oil buffer of each of the spindle motors of the first preferred embodiment and the modified preferred embodiments includes the annular recesses defined in both the stator unit 2 and the rotor unit 3. For example, it may be possible to employ a structure including an annular recess defined in at least one of the stator unit 2 and the rotor unit 3. This makes it possible to easily form the oil buffer while allowing the oil buffer to have a great enough volume.

Figure 11:
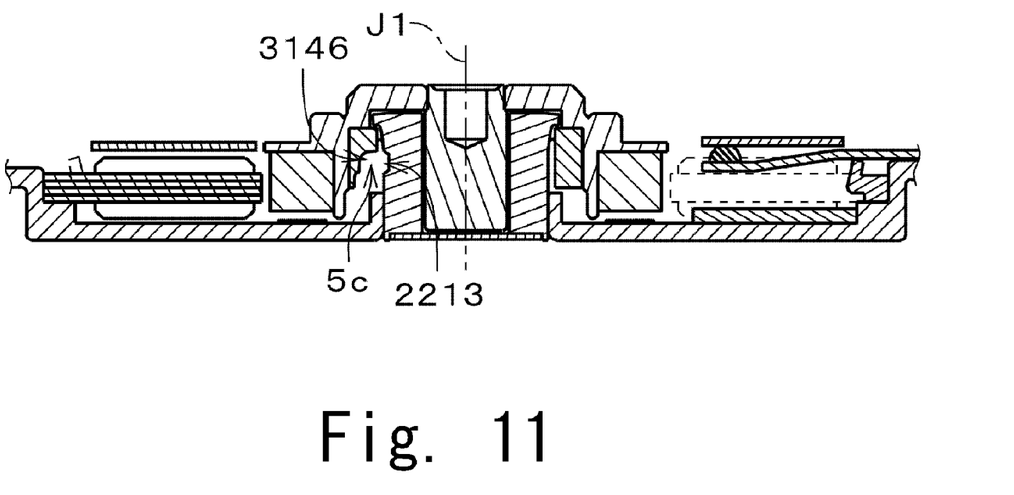
FIG. 11 is a vertical sectional view showing a spindle motor in accordance with another modified example of the first preferred embodiment.

In the spindle motors of the foregoing preferred embodiments, the required volume of the oil buffer can be readily secured by arranging the oil buffer into an annular shape about the central axis J1. This also assists in making the mass uniform along the circumferential direction of the rotor unit 3 about the central axis J1. Subject to structural restrictions or other reasons, a non-annular oil buffer may be defined between the stator unit 2 and the rotor unit 3. For example, as shown in FIG. 11, an oil buffer 5c may be provided only in a portion of the circumference about the central axis J1 by arranging the sleeve recess 2213 and the rotor hub recess 3146 in that portion.

The capillary seal is not necessarily limited to the tapering seal but may have other structures insofar as the capillary seal is capable of preventing leakage of the lubricant.

The bearing gap of each of the spindle motors is not necessarily opened axially downwards or upwards. As an alternative example, there may be provided an oil buffer opened radially outwards about the central axis J1 and continuously expanded as it moves radially outwards from the bearing opening 46.

In the spindle motors of the first preferred embodiment and the modified example, it is not always necessary to apply the oleophobic agent on the outer surface of the sleeve portion 221 and on the third inner surface 3143 of the removal-preventing member 314 of the rotor unit 3 outside the oil buffer. Depending on the structures of the spindle motors, an oleophobic treatment may be suitably performed on the surface of the rotor unit 3 and the surface of the stator unit 2 outside the oil buffer. This restrains the lubricant from adhering to the portions outside the oil buffer, while making it easy to remove the lubricant adhering to the portions outside the oil buffer. As a further alternative, an oleophobic treatment may be performed on the surface of the rotor unit 3 and the surface of the stator unit 2 inside the oil buffer. This makes it easier to remove the lubricant adhering to the portions inside the oil buffer.

The sleeve portion 221 may have, e.g., a structure including a substantially cylindrical porous sleeve body into which the shaft 33 of the rotor unit 3 is inserted and a substantially cylindrically shaped sleeve housing fixed to the outer surface of the sleeve body.

The spindle motor described above are suitable for use in a storage disk drive apparatus incorporating an access unit that performs one or both of the tasks of reading and writing information with respect to a storage disk, i.e., a reading task and/or a writing task. The storage disk drive apparatus provided with the spindle motor can be used as an apparatus arranged to drive not only a magnetic disk but also other disk-like storage media such as an optical disk, a magneto-optical disk, and the like. The spindle motor may be used in many different devices other than the storage disk drive apparatus.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A spindle motor comprising:
   a rotor unit; and
   a stator unit arranged to rotatably support the rotor unit about a central axis through a fluid dynamic pressure generated in a lubricant held within a bearing gap between the rotor unit and the stator unit; wherein
   the bearing gap has an annular opening substantially coaxial with the central axis;
   the lubricant is arranged to define a capillary seal near the annular opening within the bearing gap;
   an oil buffer is provided between the rotor unit and the stator unit, the oil buffer is arranged to continuously expand in an outward direction from the annular opening of the bearing gap and to temporarily store the lubricant when the lubricant is filled into the bearing gap;
   an oleophobic material is arranged on a surface of the rotor unit and a surface of the stator unit adjacent the oil buffer; and
   at least one recess is provided on at least one of the surface of the rotor unit and the surface of the stator unit adjacent the oil buffer at a position closer to the bearing gap than the oleophobic material, the at least one recess being defined by a radially recessed surface which extends in a direction parallel or substantially parallel to the central axis.

2. The spindle motor of claim 1, wherein the oil buffer includes an annular space substantially coaxial with the central axis.

3. The spindle motor of claim 1, wherein the at least one recess includes a first recess in one of the stator unit and the rotor unit.

4. The spindle motor of claim 3, wherein the at least one recess further includes a second recess in the other of the stator unit and the rotor unit, the second recess opposing the first recess.

5. The spindle motor of claim 1, wherein the rotor unit includes:
   a shaft;
   a rotor hub including a substantially flat disk portion extending substantially perpendicularly to the shaft from an end of the shaft and a substantially cylindrical cylinder portion protruding from the disk portion about the shaft in substantially the same direction that the shaft extends; and
   a rotor magnet fixed to the rotor hub;
   the stator unit includes:
   a sleeve portion into which the shaft is inserted; and
   a stator arranged around the sleeve portion and arranged to generate a torque acting about the central axis between the sleeve portion and the rotor magnet;

the bearing gap includes a gap defined between an outer surface of the shaft and an inner surface of the sleeve portion and a gap defined between the disk portion of the rotor hub and the sleeve portion; and the oil buffer and the annular opening of the bearing gap are provided between an inner surface of the cylinder portion of the rotor hub and an outer surface of the sleeve portion.

6. The spindle motor of claim 5, wherein the inner surface of the cylinder portion includes a step portion defining a portion of an edge of the annular opening of the bearing gap, the step portion having an inner diameter increasing as it extends toward a tip end of the cylinder portion; and the oil buffer includes a first recess defined by the step portion.

7. The spindle motor of claim 6, wherein the outer surface of the sleeve portion includes a second recess radially opposing the first recess; and the oil buffer includes the second recess portion.

8. The spindle motor of claim 1, wherein the oil buffer has a volume equal to or greater than about 105% of the volume of the bearing gap.

9. A storage disk drive apparatus comprising:

the spindle motor of claim 1 arranged to rotate a storage disk storing information thereon; and an access unit arranged to reproduce or record the information from or on the storage disk.

10. A spindle motor comprising:

a rotor unit; and a stator unit arranged to rotatably support the rotor unit about a central axis through a fluid dynamic pressure generated in a lubricant held within a bearing gap between the rotor unit and the stator unit; wherein the bearing gap has an annular opening substantially coaxial with the central axis;

the lubricant is arranged to define a capillary seal near the annular opening within the bearing gap;

at least one recess arranged outside the bearing gap and so as to continuously expand in an outward direction from the annular opening;

an oleophobic material is arranged on a surface of the rotor unit and a surface of the stator unit adjacent the bearing gap and the recess; and the at least one recess is provided on at least one of the surface of the rotor unit and the surface of the stator unit adjacent the bearing gap at a position closer to the bearing gap than the oleophobic material, the at least one recess being defined by a radially recessed surface which extends in a direction parallel or substantially parallel to the central axis.

11. The spindle motor of claim 10, wherein the at least one recess has an annular shape substantially coaxial with the central axis.

12. The spindle motor of claim 10, wherein the at least one recess includes recesses defined in both of the stator unit and the rotor unit in a mutually opposing relationship.

13. The spindle motor of claim 10, wherein the rotor unit includes:

a shaft; and a rotor hub including:

a substantially flat disk portion extending substantially perpendicularly to the shaft from an end of the shaft and a substantially cylindrical cylinder portion protruding from the disk portion about the shaft in the same direction that the shaft extends; and a rotor magnet fixed to the rotor hub;

the stator unit includes:

a sleeve portion into which the shaft is inserted; and a stator arranged around the sleeve portion and arranged to generate a torque acting about the central axis between the sleeve portion and the rotor magnet;

the bearing gap includes a gap defined between an outer surface of the shaft and an inner surface of the sleeve portion, and a gap defined between the disk portion of the rotor hub and the sleeve portion; and the annular opening of the bearing gap and the at least one recess are provided between an inner surface of the cylinder portion of the rotor hub and an outer surface of the sleeve portion.

14. The spindle motor of claim 13, wherein the oleophobic material is arranged between the inner surface of the cylinder portion of the rotor hub and the outer surface of the sleeve portion.

* * * * *